C. A. KUHR.
BRAKE FOR MOTOR VEHICLES.
APPLICATION FILED APR. 16, 1917.

1,323,990.

Patented Dec. 2, 1919.

Witnesses:

Inventor
Carl A. Kuhr
By Walter F. Murray
Attorney

UNITED STATES PATENT OFFICE.

CARL A. KUHR, OF CINCINNATI, OHIO, ASSIGNOR TO A-C MANUFACTURING COMPANY, OF CHICAGO, ILLINOIS, A CORPORATION OF ILLINOIS.

BRAKE FOR MOTOR-VEHICLES.

1,323,990.  Specification of Letters Patent.  Patented Dec. 2, 1919.

Application filed April 16, 1917. Serial No. 162,248.

*To all whom it may concern:*

Be it known that I, CARL A. KUHR, a citizen of the United States of America, and resident of Cincinnati, in the county of Hamilton and State of Ohio, have invented a new and useful Improvement in Brakes for Motor-Vehicles, of which the following is a specification.

An object of my invention is to produce an improved brake support or mounting particularly adapted for use on Ford automobiles.

A further object is to produce an improved brake mechanism for motor vehicles which will overcome the objectionable rattling of the brake elements, to be found in other brake constructions.

A further object is to provide a brake in which movement of the body and its mounting frame will not effect the operation of the brake either when the vehicle is loaded or empty.

A further object is to provide a brake which may be applied to the standard Ford construction without alteration of the parts thereof and in which the dual brake elements are caused to operate with equal braking action upon the road wheels of the vehicle.

These and other objects are attained in the brake construction described in the following specification and illustrated in the accompanying drawings, in which.

Figure 1:
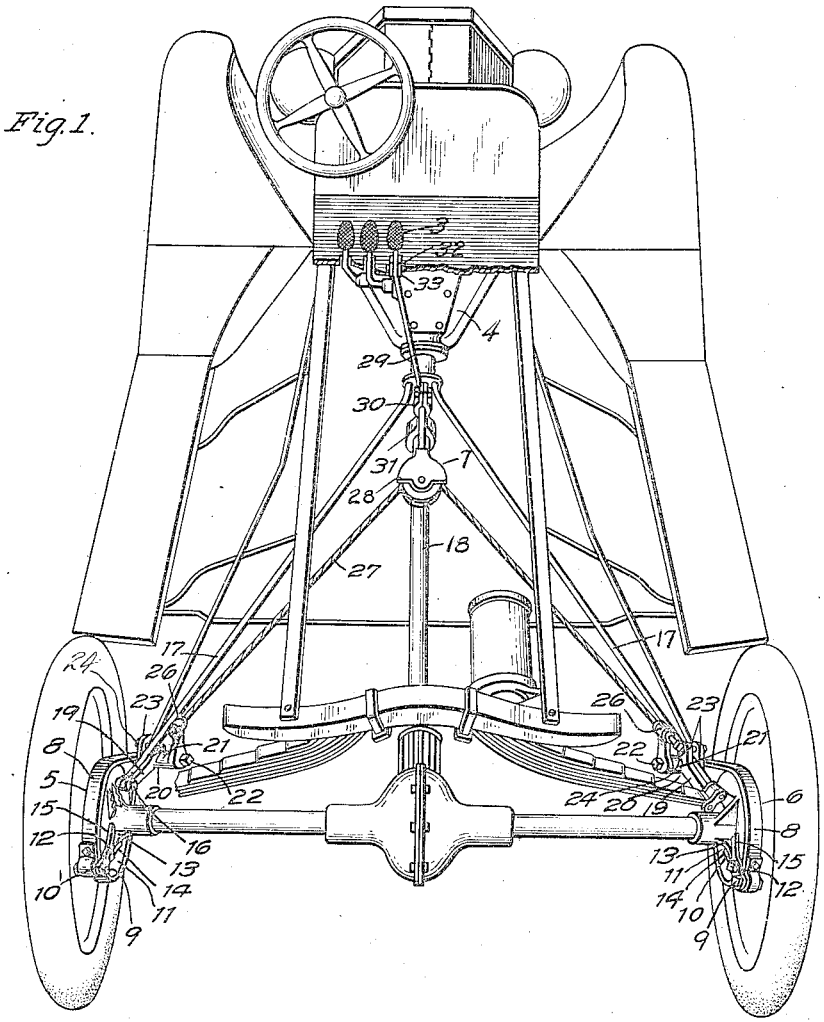
Figure 1 is a perspective view of the chassis of a Ford automobile looking from the rear thereof.

My improved brake mounting is adapted to be connected with the foot pedal 3 of the standard Ford chassis construction, which pedal is designed for operating the service brake of the vehicle. The service brake of the Ford construction is applied directly to the gear casing 4 of the power plant so that braking action is had through the propeller shaft and thence through the rear axle to the driving road wheels of the vehicle. An objection to such a construction is that all of the braking strain is applied in a manner to produce an excessive torque upon the propeller shaft and this frequently results in the propeller shaft being twisted until breakage thereof takes place. In addition to this the axles frequently break under such strains. In either case the service brake is therefore rendered worthless and accidents result. My invention is particularly adapted to overcome these objections by utilizing the service brake operating pedal 3, merely disconnecting it from the service brake contained in the transmission casing 4, for the purpose of connecting said pedal to the improved brake mounting covering the principle of this invention.

My improved brake mechanism consists of brake elements 5 and 6 which are attached to the rear wheels of the vehicle. To unite these brake elements with the operating pedal 3, I have provided an equalizing mechanism 7. Brake elements 5 and 6 consist of brake bands 8 pivotally connected midway between their ends on a bolt 9 mounted in a bracket 10 which is secured to the brake drum housing 11 by means of a bolt 12. Bolt 12 is provided in the standard Ford construction for certain structural purposes. Adjacent to this bolt is a rib 13 which is formed on the brake drum housing and extends to the rear to reinforce the drum housing. Bracket 10 is provided with an end which is bifurcated to embrace rib 13, the bifurcations 14 and 15 thereof being located on each side of the rib.

At the front of each brake drum housing a bolt 16 is provided for holding the rear end of each of the reach rods 17 which converge and extend to the front of the vehicle and which connect therewith in alinement with casing 18 of the propeller shaft. Bolts 16 which hold reach rods 17 in operative connection with the drum housings 11 are utilized for securing thereto the rearwardly extending braces 19 of brackets 20 which are secured to the reach rods. Each bracket 20 consists of a portion 21 adapted to form a bearing for a shaft 22 which extends therethrough and extending upwardly from bearing 21 is provided with lugs 23 between which the coöperating reach rod is located.

Connecting these lugs is a bolt 24 which projects over the respective reach rod so that the bracket 20 will be held in position on its reach rod, which is disposed between the lugs 23, above the shaft 22, and below the bolt 24. Arm 19 prevents its bracket from reciprocation upon the reach rod and bolt 24 prevents the bracket from becoming disengaged therefrom. Thus the bracket is held rigidly.

Figure 2:
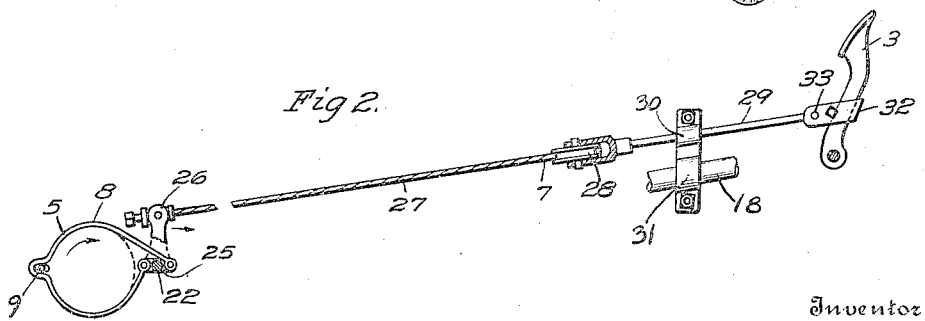
Fig. 2 is a detail sectional view of my improved brake construction.

Each shaft 22 extending through bearing 21 is provided at its outer end with a crank arm 25 to the ends of which the ends of the brake bands 8 are pivotally connected as disclosed in Fig. 2. At their inner ends the shafts 22 are provided with arms 26 which extend upwardly and are attached in any suitable manner with the ends of a cable 27 which passes over a pulley 28. Pulley 28 is secured to a rod 29 which is reciprocally mounted in a bearing 30 secured on the propeller shaft casing 18 by means of a clamp portion 31 located beneath the bearing 30. The forward end of rod 29 is attached to a clamp 32 which embraces foot pedal 3 on the transmission casing 4. This clamp is provided at its rear with a pin 33 with which the rod 29 is pivotally connected.

By means of this connection the pulley 28 is reciprocated parallel with the propeller shaft casing 18 when the foot pedal 3 is operated. This causes cable 27 to pull evenly upon the ends of the cable and to operate the brake bands 8 in uniform tension so that each wheel will be braked uniformly.

By means of my improved construction it will be seen that the parts thereof are rigidly attached and that the cable 27 will not cause any noise when it vibrates, such as occurs in the usual link and draw bar brake construction. In addition to this there are no connections with the body carrying frame of the vehicle which will cause the brake bands to grip the drums with different tensions when the body is subjected to varying loads or when the vehicle is passing over uneven ground.

Another feature of my improved brake construction is that it is particularly adapted for application to Ford cars in that the triangular formation of the rear axle with the reach rods is conformed with in locating the pulley 28 adjacent to the points of connection of the reach rods with the transmission casing 4, the ends of the cable which passes over the pulley 28, being attached adjacent to the points of attachment of the rear ends of the reach rods. Since this construction is such that the rear axle, the differential and the propeller shaft and its casing, are permitted to vibrate freely without affecting the body carrying frame of the car, the brake bands, brackets 20 and cable 27 are therefore permitted to vibrate in the same degree without being affected by the position of the body carrying frame.

Another feature of my improved construction is that in disconnecting the foot pedal 3 from the service brake with which Ford cars are equipped, it is merely necessary to disconnect the pedal from the brake without having to remove the brake from the transmission casing 4.

Having thus described my invention, what I claim is:

1. A brake mounting comprising a brace, means for supporting the same on an automobile drum housing, said means also serving to support the rear end of an automobile reach rod thereon, a bearing on said brace, a shaft projecting through said bearing below said reach rod, lugs on said bearing disposed on opposite sides of said reach rod, a bolt crossing above said reach rod connecting said lugs, a crank arm on one end of said shaft to afford a means for attaching the ends of a brake band which is mounted on said drum housing, and an arm on the other end of said shaft connected with the automobile foot pedal to be actuated by depression thereof to cause actuation of said crank arm whereby said brake band is drawn tightly around the drum housing.

2. An automobile brake mounting comprising a brace member, means for supporting one end thereof, lugs on the other end of said brace member, a bolt connecting the same co-acting with said lugs to afford a means for supporting the other end of said brace member, a shaft supported by said brace member, a brake band actuating member secured on one end of said shaft, and means connected to the other end of said shaft for actuating said shaft and said member.

3. The combination with an automobile brake drum housing and a brake band thereon, of a brace member, means for securing one end of the same to said drum housing, said means also affording a support for one end of an automobile reach rod, supporting means on said brace member for connecting the other end thereof to said reach rod, a shaft projecting through said brace member, a crank member secured on one end thereof to which the ends of said brake band are attached, and means secured on the other end of said shaft adapted to be connected with the automobile foot pedal to be actuated thereby to cause movement of said shaft and said crank member to draw said brake band tightly around said drum housing.

4. The combination with an automobile brake drum housing, a reach rod and the foot pedal, of a brake band on said drum housing, a support secured to said drum housing and to said reach rod, a shaft mounted in said support, a crank mechanism secured on one end of said shaft to which the ends of said brake band are attached, and means on the other end of said shaft connected with said foot pedal to be actuated thereby to cause said crank mechanism to draw the brake band tightly around said drum housing.

In testimony whereof, I have hereunto subscribed my name this 14th day of April, 1917.

CARL A. KUHR.

Witnesses:
WALTER F. MURRAY,
W. THORNTON BOGERT.